(12) United States Patent
Miftakhov et al.

(10) Patent No.: US 12,351,331 B2
(45) Date of Patent: Jul. 8, 2025

(54) REFUELING SYSTEM FOR HYDROGEN FUEL CELL-POWERED AIRCRAFT

(71) Applicant: ZeroAvia, Ltd., Cirencester (GB)

(72) Inventors: Valery Miftakhov, San Carlos, CA (US); Sergey Kiselev, London (GB)

(73) Assignee: ZeroAvia, Ltd., Cirencester (GB)

( * ) Notice: Subject to any disclaimer, the term of this patent is extended or adjusted under 35 U.S.C. 154(b) by 761 days.

(21) Appl. No.: 17/656,877

(22) Filed: Mar. 28, 2022

(65) Prior Publication Data

US 2022/0336829 A1    Oct. 20, 2022

Related U.S. Application Data

(60) Provisional application No. 63/168,683, filed on Mar. 31, 2021.

(51) Int. Cl.
| | |
|---|---|
| *B64D 37/16* | (2006.01) |
| *B64D 37/30* | (2006.01) |
| *H01M 8/04007* | (2016.01) |
| *H01M 8/04082* | (2016.01) |
| *H01M 8/04111* | (2016.01) |
| *B64D 27/355* | (2024.01) |
| *B64F 1/28* | (2006.01) |
| *H01M 8/04089* | (2016.01) |

(52) U.S. Cl.
CPC ............. *B64D 37/16* (2013.01); *B64D 37/30* (2013.01); *H01M 8/04007* (2013.01); *H01M 8/04111* (2013.01); *H01M 8/04201* (2013.01); *B64D 27/355* (2024.01); *B64F 1/28* (2013.01); *H01M 8/04089* (2013.01); *H01M 2250/20* (2013.01); *Y02T 90/40* (2013.01)

(58) Field of Classification Search
CPC ...... B64D 37/16; B64D 37/30; B64D 27/355; H01M 8/04111; H01M 8/04007; H01M 8/04201; H01M 8/04089; H01M 8/04208; H01M 2250/20; Y02T 90/40; B64F 1/28
USPC .......................................................... 137/899
See application file for complete search history.

(56) References Cited

U.S. PATENT DOCUMENTS 3,782,400 A * 1/1974 Hardison ............... B64D 37/16
137/413
5,811,201 A * 9/1998 Skowronski ............ H01M 8/04
429/414

(Continued)

*Primary Examiner* — Minh Q Le
(74) *Attorney, Agent, or Firm* — OSHA BERGMAN WATANABE & BURTON LLP

(57) ABSTRACT

A refueling system for hydrogen fuel cell-powered aircraft is disclosed. The system includes a compressor to receive a source of low temperature, high pressure hydrogen gas and compress the low temperature, high pressure hydrogen gas into a higher temperature, higher pressure hydrogen gas. A compression chamber within the compressor to receive the higher temperature, higher pressure hydrogen gas from the compressor. A valve coupled with the compression chamber to reduce the pressure of the higher temperature, higher pressure hydrogen gas to a higher temperature, lower pressure hydrogen gas. A storage container on an aircraft to receive the higher temperature, lower pressure hydrogen gas via the pressure relief valve. A heat exchanger in thermal cooperation with the compression chamber, the heat exchanger configured to absorb heat from the compression chamber and convert the heat into storable energy.

20 Claims, 3 Drawing Sheets

(56) References Cited

U.S. PATENT DOCUMENTS

| | | | |
|---|---|---|---|
| 2004/0124308 A1* | 7/2004 | Daggett | H01M 8/04089 |
| | | | 244/58 |
| 2013/0306797 A1* | 11/2013 | Dalle Donne | B64D 37/12 |
| | | | 244/135 R |
| 2014/0023945 A1* | 1/2014 | Epstein | B64D 37/30 |
| | | | 429/513 |
| 2016/0297544 A1* | 10/2016 | Kim | H02J 7/35 |
| 2018/0003109 A1* | 1/2018 | Lents | B64D 27/24 |
| 2021/0091395 A1* | 3/2021 | Jeong | H01M 8/04111 |
| 2021/0207538 A1* | 7/2021 | O'Flarity | C01B 3/0026 |
| 2021/0207540 A1* | 7/2021 | Roberge | F02C 9/40 |
| 2021/0316877 A1* | 10/2021 | Rheaume | H01M 8/04111 |
| 2022/0009379 A1* | 1/2022 | Mikic | B64D 35/023 |
| 2022/0297844 A1* | 9/2022 | Mackin | B64D 35/023 |
| 2022/0302477 A1* | 9/2022 | Landolt | H01M 8/04425 |
| 2022/0306306 A1* | 9/2022 | Labarthe | B64D 33/08 |
| 2022/0326671 A1* | 10/2022 | Le Bras | B64C 19/00 |
| 2022/0332219 A1* | 10/2022 | Miftakhov | H01M 8/04007 |
| 2022/0411083 A1* | 12/2022 | Kierbel | B64D 37/06 |
| 2023/0348081 A1* | 11/2023 | Riediger | B64D 27/12 |
| 2023/0391467 A1* | 12/2023 | Palmer | H01M 8/04014 |
| 2024/0308674 A1* | 9/2024 | Vincekovic | B64U 50/19 |

* cited by examiner

REFUELING SYSTEM FOR HYDROGEN FUEL CELL-POWERED AIRCRAFT

CROSS-REFERENCE TO RELATED APPLICATIONS (PROVISIONAL)

This application claims priority to and benefit of U.S. Provisional Patent Application No. 63/168,683 filed on Mar. 31, 2021, entitled "REFUELING SYSTEM FOR HYDROGEN FUEL CELL-POWERED AIRCRAFT" by Miftakhov et al., and assigned to the assignee of the present application, the disclosure of which is hereby incorporated by reference in its entirety.

FIELD OF THE INVENTION

Embodiments of the present technology relate generally to hydrogen fuel cell-powered aircraft and, more specifically, to systems and methods for refueling hydrogen fuel cell-powered aircraft.

BACKGROUND

Hydrogen fuel is often in the form of cryogenic liquid hydrogen or gaseous hydrogen. Storage of either of these types of hydrogen fuels may be challenging because hydrogen fuel may leak from its container, rapidly boil off, and/or dissipate from some other process. In addition, the use of hydrogen fuel cell technology presents alternative or additional challenges not encountered in conventionally powered aircraft design

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Hydrogen is typically produced at relatively low pressures (20-30 bar) and must be compressed prior to transport. In order to transport large amounts of hydrogen it must be either pressurized and delivered as a compressed gas, or liquefied. Hydrogen is transported from the point of production to the point of storage or use via pipeline, over the road in cryogenic liquid tanker trucks or gaseous tube trailers, or by rail or barge. Hydrogen used in portable or stationary applications can be delivered by truck to a storage facility or in cylinders, similar to the propane used for gas grills, or in cartridges that would resemble a battery.

Certain protocols and processes for hydrogen fueling have process limits (including the fuel delivery temperature, the maximum fuel flow rate, the rate of pressure increase and the ending pressure) which can be affected by factors such as ambient temperature, fuel delivery temperature, and initial pressure in the vehicle's compressed hydrogen storage system.

An important factor in the performance of hydrogen fueling is the storage equipment cooling capability and the resultant fuel delivery temperature. There are typically different delivery temperature categories denoted by a "T" rating, e.g., T40, T30, and T20, ($-40°$ C., $-30°$ C., $-20°$ C., respectively) where T40 is the coldest. Pressure is also an important factor when fueling. Hydrogen is typically stored in high quantities at a low temperature and high pressure whereas, a vehicle fuel cylinder or tank typically stores the hydrogen at a lower pressure and higher (e.g., ambient) temperature.

Figure 1:
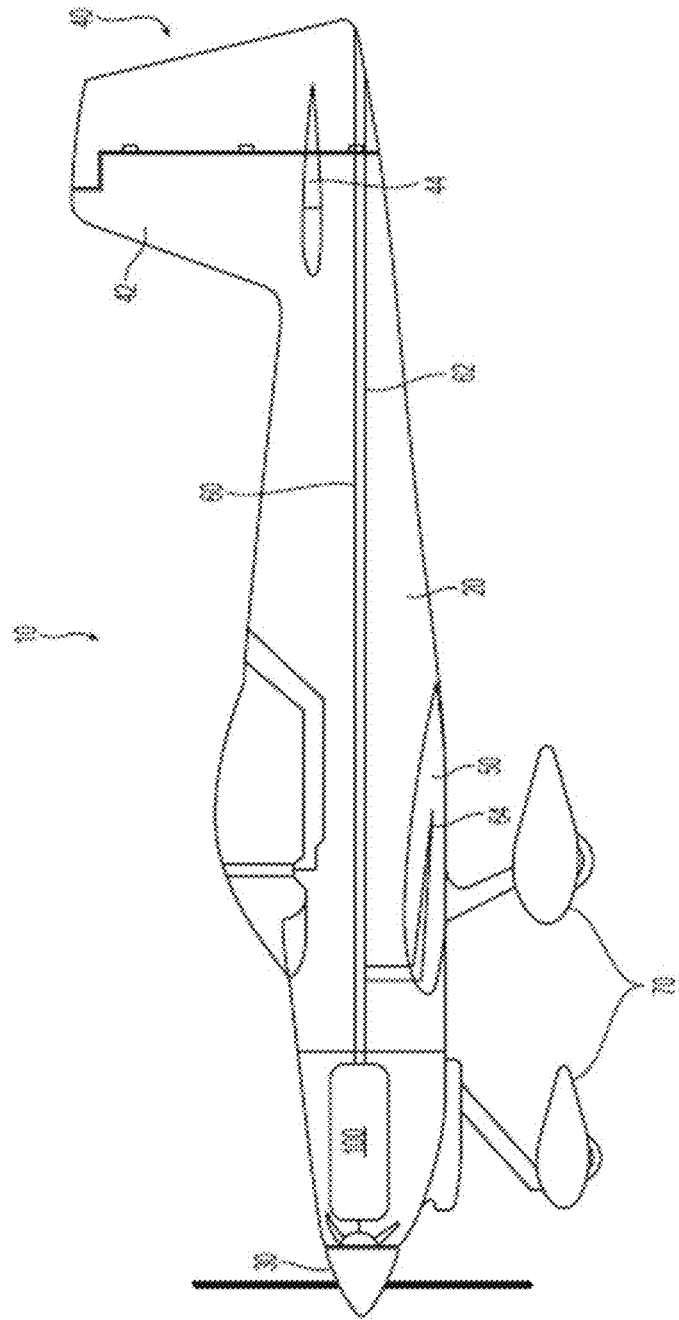
FIG. 1 is a side view of a hydrogen fuel cell-powered aircraft, in accordance with an embodiment.

Referring now to FIG. 1, a hydrogen fuel cell-powered aircraft 10 is illustrated and described as a turboprop aircraft in accordance with an embodiment. In another embodiment, other suitable aircraft configurations may also be used within the realm of hydrogen fuel cell-powered aircraft. Aircraft 10 generally includes a fuselage 20, a propulsor 30 (e.g., a propeller) disposed at a forward end of fuselage 20, a tail 40 disposed at a rear end of fuselage 20 and includes a vertical stabilizer 42 and a pair of horizontal stabilizers 44 (only one of which is shown) extending outwardly from either side of tail 40, a pair of wings 50 (only one of which is shown) extending outwardly from either side of fuselage 20, an exhaust system 60 including a fuselage portion 62 and/or a wing portion 64, a pair of wheel assemblies 70, and a hydrogen fuel cell-powered electric engine system 100.

Figure 2:
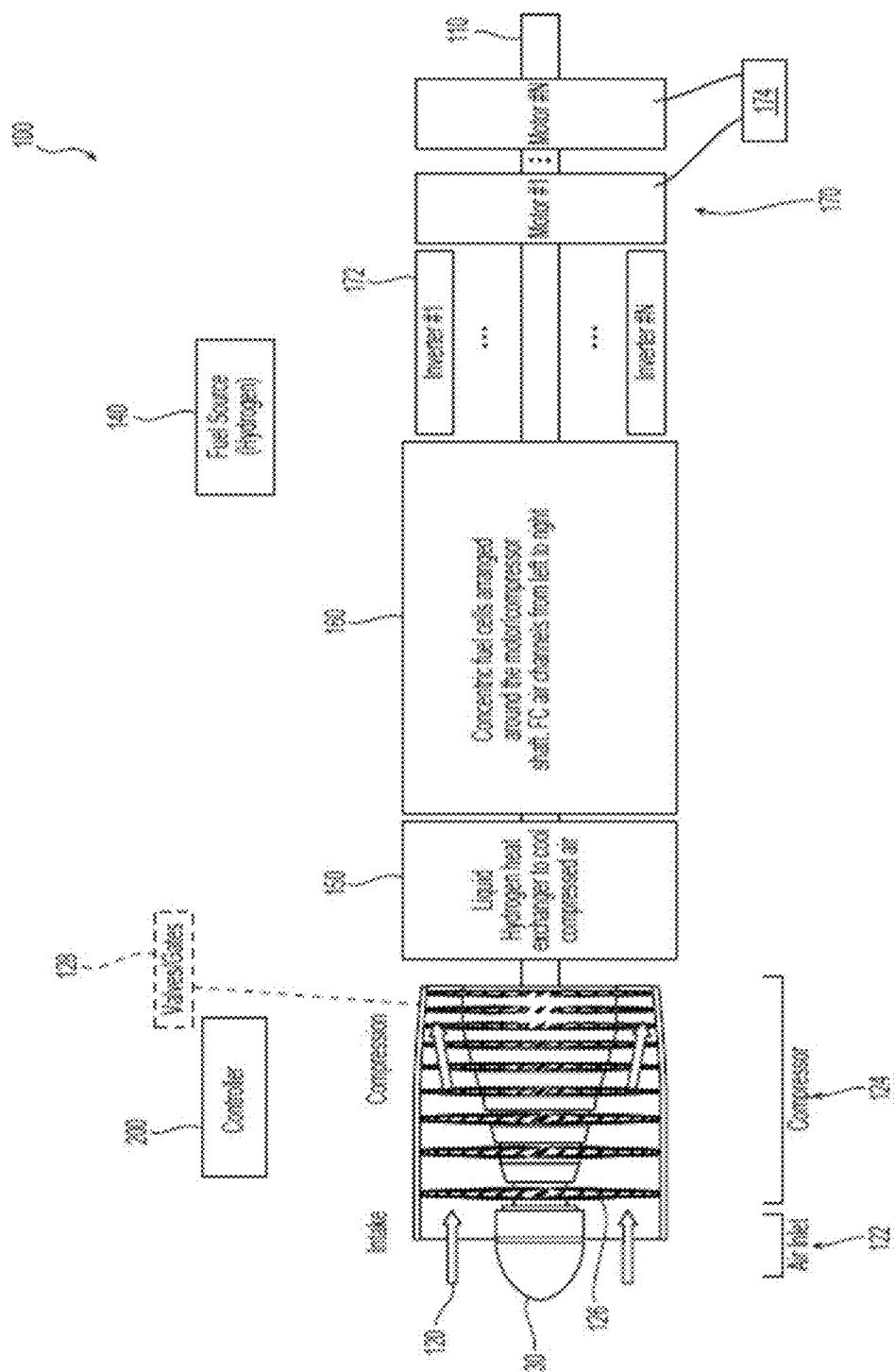
FIG. 2 is a schematic illustration of a hydrogen fuel cell-electric engine system of the aircraft of FIG. 1, in accordance with an embodiment.

With additional reference to FIG. 2, in one embodiment, hydrogen fuel cell-powered electric engine system 100 includes an elongated shaft 110 that extends through the powertrain of system 100 to function as a common shaft of the powertrain. In another embodiment, a different length shaft 110 and/or powertrain, and/or components thereof may be used.

In one embodiment, elongated shaft 110 supports and/or is coupled with a propulsor 30, an air compressor system 120, a pump 130 in fluid communication with a fuel source 140, a heat exchanger 150 in fluid communication with air compressor system 120, a hydrogen fuel cell stack 160 in fluid communication with heat exchanger 150, and a motor assembly 170 disposed in electrical communication with fuel cell stack 150.

In one embodiment, air compressor system 120 includes an air inlet portion 122 and a compressor portion 124 positioned rearwardly of air inlet portion 122 to enable uninterrupted, axial delivery of airflow into compressor portion 124 in the forward to rear direction. Compressor portion 124 supports one or more rotatable compressor wheels 126 that rotate in response to rotation of elongated shaft 110 for compressing air received through air inlet portion 122 and pushing the compressed air to fuel cell stack 160 wherein the compressed air is converted to electrical energy. In one embodiment, a number of compressor wheels 126 and/or a diameter, longitudinal spacing, and/or configuration thereof can be modified as desired to change the amount of air supply, e.g., to increase power. In one embodiment, compressor portion 124 can have one or more bypass valves and/or wastegates 128 to regulate the pressure and flow of the air that enters the downstream fuel cell stack 160, as well as to manage the cold air supply to any auxiliary heat exchangers in the system 100.

The electrical energy generated from fuel cell stack 160 is transmitted to motor assembly 170, which is also coaxially supported on elongated shaft 110. Motor assembly 170 includes a plurality of inverters 172 configured to convert the direct current to alternating current for actuating one or more of a plurality of motors 174 of motor assembly 170 in electrical communication with the inverters 172. The plurality of motors 174 are configured to drive (e.g., rotate) elongated shaft 110 in response to the electrical energy received from fuel cell stack 160 for operating the components on the elongated shaft 110 as elongated shaft 110 is rotated, thereby powering aircraft 10 (FIG. 1) and the components thereof.

In one embodiment, controller 200 of system 100 may be, for example, a full authority digital engine (or electronics) control (e.g., a FADEC), or other suitable controller for controlling the various aspects of system 100 and/or other components of aircraft 10 (FIG. 1).

Figure 3:
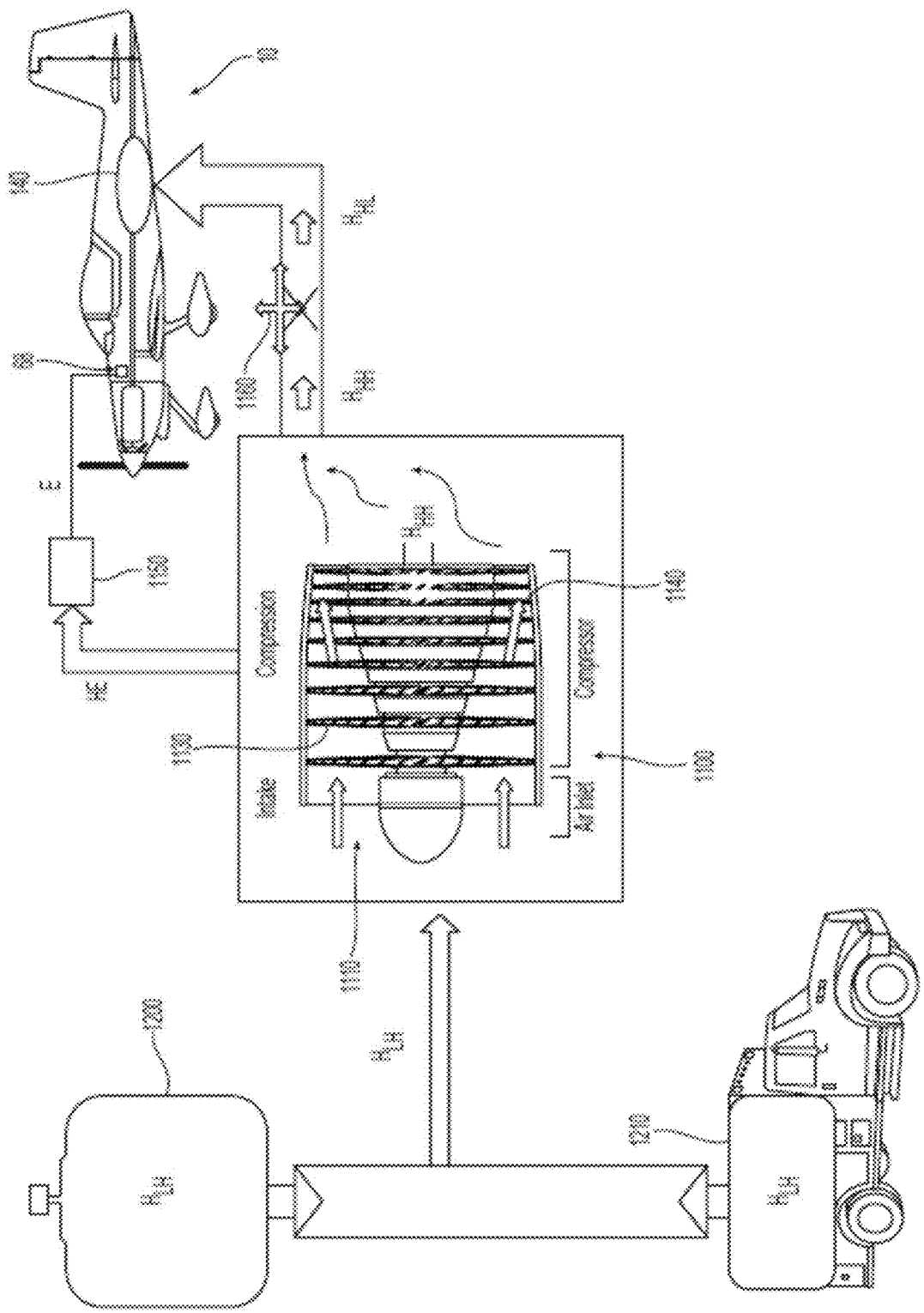
FIG. 3 is a block diagram of a fueling system for a hydrogen fuel cell-powered aircraft, in accordance with an embodiment.

With reference now to FIG. 3, in conjunction with FIGS. 1 and 2, a fueling system for a hydrogen fuel cell-powered aircraft 10 is shown, and is generally identified as fueling system 1000, in accordance with one embodiment. Fueling system 1000 includes a turbine compressor 1100 configured to operably connect to a hydrogen fueling source, e.g., fueling tank 1200 or fueling truck 1210, which stores a large amount of highly compressed hydrogen gas at low temperature ($H_{LH}$) for use with hydrogen fueling systems. Turbine compressor 1100 includes an air intake cavity 1110 defined therein which is configured to intake the $H_{LH}$ from the fueling source 1210, 1200 into the compressor 1100 for compression.

In one embodiment, the Hui from the fueling source 1210, 1200 is fed passed a series of turbine blades 1130 (e.g., rotary turbine blades) which compresses the $H_{LH}$ into one or more compression chambers 1140 defined on the other side of the turbine blades 1130. As the $H_{LH}$ is compressed, the compressed $H_{LH}$ is heated to a higher or more convenient temperature for storage on aircraft 10.

Once the heat is released, the pressure of the high temperature, high pressure hydrogen gas ($H_{HH}$) may be reduced via a pressure reducing valve 1160 for storage. The higher temperature, lower pressure converted hydrogen gas ($H_{HL}$) may be stored in one or more cylinders 140 anywhere on the aircraft 10.

A secondary advantage to utilizing a turbine compressor 1100 for converting the $H_{LH}$ to $H_{HL}$ that is more convenient for storage is that excess energy, e.g., heat, may be converted into auxiliary energy for use with powering (or power-assist) other components of the aircraft 10. For example, the excess heat from the turbine compressor 1100 may be used to heat various other components of the aircraft 10, or fed through a heat exchanger or thermoelectric generator 1150 to convert the heat into other types of energy that may be stored for subsequent use via a battery 68, power-assist with aircraft takeoff or power surges.

One embodiment includes a method of fueling a hydrogen fuel cell-powered aircraft 10 and includes connecting a compressor 1100 to a source 1210, 1200 of $H_{LH}$, the compressor 1100 defining an intake manifold 1110 configured to receive the $H_{LH}$ from the source 1210, 1200 and direct the $H_{LH}$ through a plurality of compression blades 1130, the plurality of compression blades 1130 configured to compress the $H_{LH}$ into $H_{HH}$ as the $H_{LH}$ passes therethrough into a compression chamber 1140 defined within the compressor 1100. In one embodiment, coupling a pressure relief valve 1160 to the compression chamber 1140 will reduce the pressure of the $H_{HH}$ to $H_{HL}$. In one embodiment, when fueling a storage container 140 on an aircraft 10 with the $H_{HL}$ a heat exchanger or thermoelectric generator 1150 in thermal cooperation with the compression chamber 1140 is used to absorb excess heat from the compression chamber 1140 and convert the excess heat into storable energy for powering other components of the aircraft 10.

It should be understood the disclosed structure can include any suitable mechanical, electrical, and/or chemical components for operating the disclosed system or components thereof. For instance, such electrical components can include, for example, any suitable electrical and/or electromechanical and/or electrochemical circuitry, which may include or be coupled with one or more printed circuit boards. As appreciated, the disclosed computing devices and/or server can include, for example, a "controller," "processor," "digital processing device" and like terms, and which are used to indicate a microprocessor or central processing unit (CPU). The CPU is the electronic circuitry within a computer that carries out the instructions of a computer program by performing the basic arithmetic, logical, control and input/output (I/O) operations specified by the instructions, and by way of non-limiting examples, include server computers. In one embodiment, the controller includes an operating system configured to perform executable instructions. The operating system is, for example, software, including programs and data, which manages hardware of the disclosed apparatus and provides services for execution of applications for use with the disclosed apparatus. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. In one embodiment, the operating system is provided by cloud computing.

In one embodiment, the term "controller" may be used to indicate a device that controls the transfer of data from a computer or computing device to a peripheral or separate device and vice versa, and/or a mechanical and/or electro-mechanical device (e.g., a lever, knob, etc.) that mechanically operates and/or actuates a peripheral or separate device.

In one embodiment, the controller includes a storage and/or memory device. The storage and/or memory device is one or more physical apparatus used to store data or programs on a temporary or permanent basis. In one embodiment, the controller includes volatile memory and requires power to maintain stored information. In one embodiment, the controller includes non-volatile memory and retains stored information when it is not powered. In one embodiment, the non-volatile memory includes flash memory. In one embodiment, the non-volatile memory includes dynamic random-access memory (DRAM). In one embodiment, the non-volatile memory includes ferroelectric random-access memory (FRAM). In one embodiment, the non-volatile memory includes phase-change random access memory (PRAM). In one embodiment, the controller is a storage device including, by way of non-limiting examples, CD-ROMs, DVDs, flash memory devices, magnetic disk drives, magnetic tapes drives, optical disk drives, and cloudcomputing-based storage. In one embodiment, the storage and/or memory device is a combination of devices such as those disclosed herein.

In one embodiment, the memory can be random access memory, read-only memory, magnetic disk memory, solid state memory, optical disc memory, and/or another type of memory. In one embodiment, the memory can be separate from the controller and can communicate with the processor through communication buses of a circuit board and/or through communication cables such as serial ATA cables or other types of cables. The memory includes computer-readable instructions that are executable by the processor to operate the controller. In one embodiment, the controller may include a wireless network interface to communicate with other computers or a server. In one embodiment, a storage device may be used for storing data. In one embodiment, the processor may be, for example, without limitation, a digital signal processor, a microprocessor, an ASIC, a graphics processing unit ("GPU"), field-programmable gate array ("FPGA"), or a central processing unit ("CPU").

The memory stores suitable instructions, to be executed by the processor, for receiving the sensed data (e.g., sensed data from GPS, camera, etc. sensors), accessing storage device of the controller, generating a raw image based on the sensed data, comparing the raw image to a calibration data set, identifying an object based on the raw image compared to the calibration data set, transmitting object data to a ground-based post-processing unit, and displaying the object data to a graphic user interface. Although illustrated as part of the disclosed structure, in one embodiment, a controller may be remote from the disclosed structure (e.g., on a remote server), and accessible by the disclosed structure via a wired or wireless connection. In one embodiment where the controller is remote, it may be accessible by, and connected to, multiple structures and/or components of the disclosed system.

The term "application" may include a computer program designed to perform particular functions, tasks, or activities for the benefit of a user. Application may refer to, for example, software running locally or remotely, as a stand-alone program or in a web browser, or other software which would be understood by one skilled in the art to be an application. An application may run on the disclosed controllers or on a user device, including for example, on a mobile device, an IoT device, or a server system.

In one embodiment, the controller includes a display to send visual information to a user. In one embodiment, the display is a cathode ray tube (CRT). In one embodiment, the display is a liquid crystal display (LCD). In one embodiment, the display is a thin film transistor liquid crystal display (TFT-LCD). In one embodiment, the display is an organic light-emitting diode (OLED) display. In one embodiment, on OLED display is a passive-matrix OLED (PMOLED) or active-matrix OLED (AMOLED) display. In one embodiment, the display is a plasma display. In one embodiment, the display is a video projector. In one embodiment, the display is interactive (e.g., having a touch screen or a sensor such as a camera, a 3D sensor, a LiDAR, a radar, etc.) that can detect user interactions/gestures/responses and the like. In one embodiment, the display is a combination of devices such as those disclosed herein.

The controller may include or be coupled with a server and/or a network. As used herein, the term "server" includes "computer server," "central server," "main server," and like terms to indicate a computer or device on a network that manages the disclosed apparatus, components thereof, and/or resources thereof. As used herein, the term "network" can include any network technology including, for instance, a cellular data network, a wired network, a fiber-optic network, a satellite network, and/or an IEEE 802.11a/b/g/n/ac wireless network, among others.

In one embodiment, the controller can be coupled with a mesh network. As used herein, a "mesh network" is a network topology in which each node relays data for the network. In general, mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

In one embodiment, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines or sections of programs that perform a particular task.

As used herein, the controller includes software modules for managing various functions of the disclosed system or components thereof.

The disclosed structure may also utilize one or more controllers to receive various information and transform the received information to generate an output. The controller may include any type of computing device, computational circuit, or any type of processor or processing circuit capable of executing a series of instructions that are stored in memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A system comprising:
   a source of low temperature, high pressure hydrogen gas;
   a compressor adapted to fluidly couple with said source of low temperature, high pressure hydrogen gas, said compressor comprising:
      an intake manifold configured to receive said low temperature, high pressure hydrogen gas from said source and direct said low temperature, high pressure hydrogen gas through a plurality of compression blades;
      said plurality of compression blades configured to compress said low temperature, high pressure hydrogen gas into a higher temperature, higher pressure hydrogen gas as said low temperature, high pressure hydrogen gas passes therethrough; and
      a compression chamber defined within said compressor, said compression chamber to receive said higher temperature, higher pressure hydrogen gas from said plurality of compression blades;
   a valve operably coupled with said compression chamber, said valve configured to reduce said pressure of said higher temperature, higher pressure hydrogen gas to a higher temperature, lower pressure hydrogen gas;
   a storage container on an aircraft, said storage container to receive said higher temperature, lower pressure hydrogen gas via said valve; and
   a heat exchanger disposed in thermal cooperation with said compression chamber and configured to absorb excess heat from said compression chamber and convert said excess heat into storable energy to power at least one other component of said aircraft.

2. The system of claim 1, wherein said compressor is a turbine compressor.

3. The system of claim 1, wherein said storable energy is stored within a battery disposed in said aircraft.

4. The system of claim 3, wherein said battery is used to power-assist a take-off of said aircraft.

5. The system of claim 1, wherein said plurality of compression blades are rotary turbine blades.

6. The system of claim 1, wherein said heat exchanger is a thermoelectric generator.

7. The system of claim 1, wherein said source of low temperature, high pressure hydrogen gas is selected from a group consisting of: a truck, a storage container, and a transport pipeline.

8. A method of fueling a hydrogen fuel cell-powered aircraft, said method comprising:
   connecting a compressor to a source of low temperature, high pressure hydrogen gas, said compressor comprising:
      an intake manifold for receiving said low temperature, high pressure hydrogen gas from said source and directing said low temperature, high pressure hydrogen gas through a plurality of compression blades;
      said plurality of compression blades compressing said low temperature, high pressure hydrogen gas into a higher temperature, higher pressure hydrogen gas as said low temperature, high pressure hydrogen gas passes therethrough; and
   storing said higher temperature, higher pressure hydrogen gas in a compression chamber defined within said compressor;
   coupling a pressure relief valve to said compression chamber, said pressure relief valve reducing said pressure of said higher temperature, higher pressure hydrogen gas to a higher temperature, lower pressure hydrogen gas;
   fueling a storage container on an aircraft with said higher temperature, higher pressure hydrogen gas received via said pressure relief valve; and
   coupling a thermoelectric generator with said compression chamber, said thermoelectric generator absorbing excess heat from said compression chamber and converting said excess heat into storable energy available for powering other components of said aircraft.

9. The method of claim 8, wherein said compressor is a turbine compressor.

10. The method of claim 8, wherein said storable energy is stored within a battery disposed in said aircraft.

11. The method of claim 10, wherein said battery is used to power-assist a take-off of said aircraft.

12. The method of claim 8, wherein said plurality of compression blades are rotary turbine blades.

13. The method of claim 8, wherein said thermoelectric generator is a heat exchanger.

14. The method of claim 8, wherein said source of low temperature, high pressure hydrogen gas is selected from a group consisting of: a truck, a storage container, and a transport pipeline.

15. A system comprising:
   a source of low temperature, high pressure hydrogen gas;
   a compressor adapted to fluidly couple with said source of low temperature, high pressure hydrogen gas and compress said low temperature, high pressure hydrogen gas into a higher temperature, higher pressure hydrogen gas;
   a compression chamber defined within said compressor, said compression chamber to receive said higher temperature, higher pressure hydrogen gas from said compressor;
   a pressure relief valve coupled with said compression chamber, said pressure relief valve configured to reduce said pressure of said higher temperature, higher pressure hydrogen gas to a higher temperature, lower pressure hydrogen gas;

a storage container on an aircraft, said storage container to receive said higher temperature, lower pressure hydrogen gas via said pressure relief valve; and a heat exchanger disposed in thermal cooperation with said compression chamber, said heat exchanger configured to absorb heat from said compression chamber and convert said heat into storable energy.

16. The system of claim 15 wherein said compressor comprises:

an intake manifold configured to receive said low temperature, high pressure hydrogen gas from said source and direct said low temperature, high pressure hydrogen gas through a plurality of compression blades; and said plurality of compression blades configured to compress said low temperature, high pressure hydrogen gas into a higher temperature, higher pressure hydrogen gas as said low temperature, high pressure hydrogen gas passes therethrough.

17. The system of claim 16 wherein said compression chamber is configured to receive said higher temperature, higher pressure hydrogen gas from said plurality of compression blades.

18. The system of claim 15, further comprising:

a battery disposed within said aircraft, said battery configured to store said storable energy.

19. The system of claim 18, wherein said storable energy stored in said battery is used to power-assist a take-off of said aircraft.

20. The system of claim 15, wherein said storable energy to power at least one other component of said aircraft.

\* \* \* \* \*